United States Patent
Matsuoka (10) Patent No.: US 6,688,122 B2
(45) Date of Patent: Feb. 10, 2004

(54) VEHICLE AIR-CONDITIONING SYSTEM

(75) Inventor: Takayoshi Matsuoka, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 30 days.

(21) Appl. No.: 10/233,515

(22) Filed: Sep. 4, 2002

(65) Prior Publication Data

US 2003/0079484 A1 May 1, 2003

(30) Foreign Application Priority Data

Oct. 26, 2001 (JP) ........................ 2001-329281

(51) Int. Cl.⁷ .................. F25D 17/00; F25B 27/00; B60H 1/32
(52) U.S. Cl. .................. 62/134; 62/180; 62/236
(58) Field of Search .................. 62/180, 236, 259.2, 62/134, 133, 228.4

(56) References Cited

U.S. PATENT DOCUMENTS

| | | | |
|---|---|---|---|
| 6,418,738 B1 | * | 7/2002 | Yamashita .................. 62/183 |
| 6,481,230 B2 | * | 11/2002 | Kimishima et al. ........... 62/239 |
| 6,523,361 B2 | * | 2/2003 | Higashiyama ............. 62/228.4 |

FOREIGN PATENT DOCUMENTS

JP     2000-230482 A     8/2000

* cited by examiner

*Primary Examiner*—Marc Norman
(74) *Attorney, Agent, or Firm*—Shinjyu Global IP Counselors, LLP (57) ABSTRACT

A vehicle air-conditioning system with a motor driven compressor is control to suppress overheating of the electronic devices inside the compressor inverter and to suppress overheating of the battery. If the compressor intake refrigerant temperature is high when the compressor starts up, the maximum allowable rotational speed of the compressor is limited and the airflow rate of the blower fan is reduced by lowering the voltage of the blower fan motor. As a result, overheating of the electronic devices inside the compressor inverter is suppressed. Also, if the compressor intake refrigerant temperature is high when the compressor starts up, the load on the battery is lightened and overheating of the battery is suppressed by switching the source of the electric power supplied to the compressor from the battery to the motor generator.

20 Claims, 4 Drawing Sheets

VEHICLE AIR-CONDITIONING SYSTEM

BACKGROUND OF THE INVENTION

1. Field of the Invention

The present invention generally relates to a vehicle air-conditioning system provided with a compressor that can be driven with a motor. More specifically, the present invention relates to suppressing the overheating of the electronic devices inside the inverter of the compressor and the overheating of the battery due to the operation a vehicle air-conditioning system having a motor driven compressor.

BACKGROUND INFORMATION

An example of a vehicle air-conditioning system is described in Japanese Laid-Open Patent Publication No. 2000-230482. The vehicle air-conditioning system disclosed in this publication has a hybrid compressor that is constructed such that the compression section is driven by two drive sources. In particular, a first driving force is provided by a motor that is driven by the battery, while a second driving force is delivered from the engine through an electromagnetic clutch. The vehicle air-conditioning system executes capacity limiting determination such that the refrigerant compression capacity of the compression section decreases when the compression section is motor driven with the electromagnetic clutch in the OFF state.

In view of the above, it will be apparent to those skilled in the art from this disclosure that there exists a need for an improved vehicle air-conditioning system. This invention addresses this need in the art as well as other needs, which will become apparent to those skilled in the art from this disclosure.

SUMMARY OF THE INVENTION

It has been discovered that in vehicle air-conditioning systems, such as the one disclosed in Japanese Laid-Open Patent Publication No. 2000-230482, if operation of the compressor is started while the intake refrigerant temperature of the compressor is high, a large current will occur in the inverter of the compressor because the drive load on the compressor will be high. Consequently, the electronic devices inside the inverter will become excessively hot such that the inverter will rapidly overheat. At the same time, a burden will be placed on the battery that will cause overheating in the battery as well lead to a shortening of service life.

Therefore, one object of the present invention is to provide an improved vehicle air-conditioning system that suppresses overheating of the electronic devices inside the inverter and that suppresses overheating of the battery.

In accordance with one aspect of the present invention, an improved vehicle air-conditioning system is provided with a compressor; a compressor inverter, a passenger compartment-external heat exchanger, a passenger compartment-internal heat exchanger, a thermal load detecting device and an airflow rate correcting device. The compressor inverter is configured to vary the compressor capacity of the compressor to provide a predetermined air-conditioning level inside of a passenger compartment. The passenger compartment-external heat exchanger is configured to exchange heat between outside air and refrigerant pumped by the compressor. The passenger compartment-internal heat exchanger is configured to exchange heat between the refrigerant and the air that is blown into the passenger compartment by an air blowing device. The thermal load detecting device is configured to detect a thermal load of the compressor. The airflow rate correcting device is configured to adjust airflow rate in such a manner that the airflow rate delivered by the air blowing device decreases as the thermal load detected by the thermal load detecting device increases.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
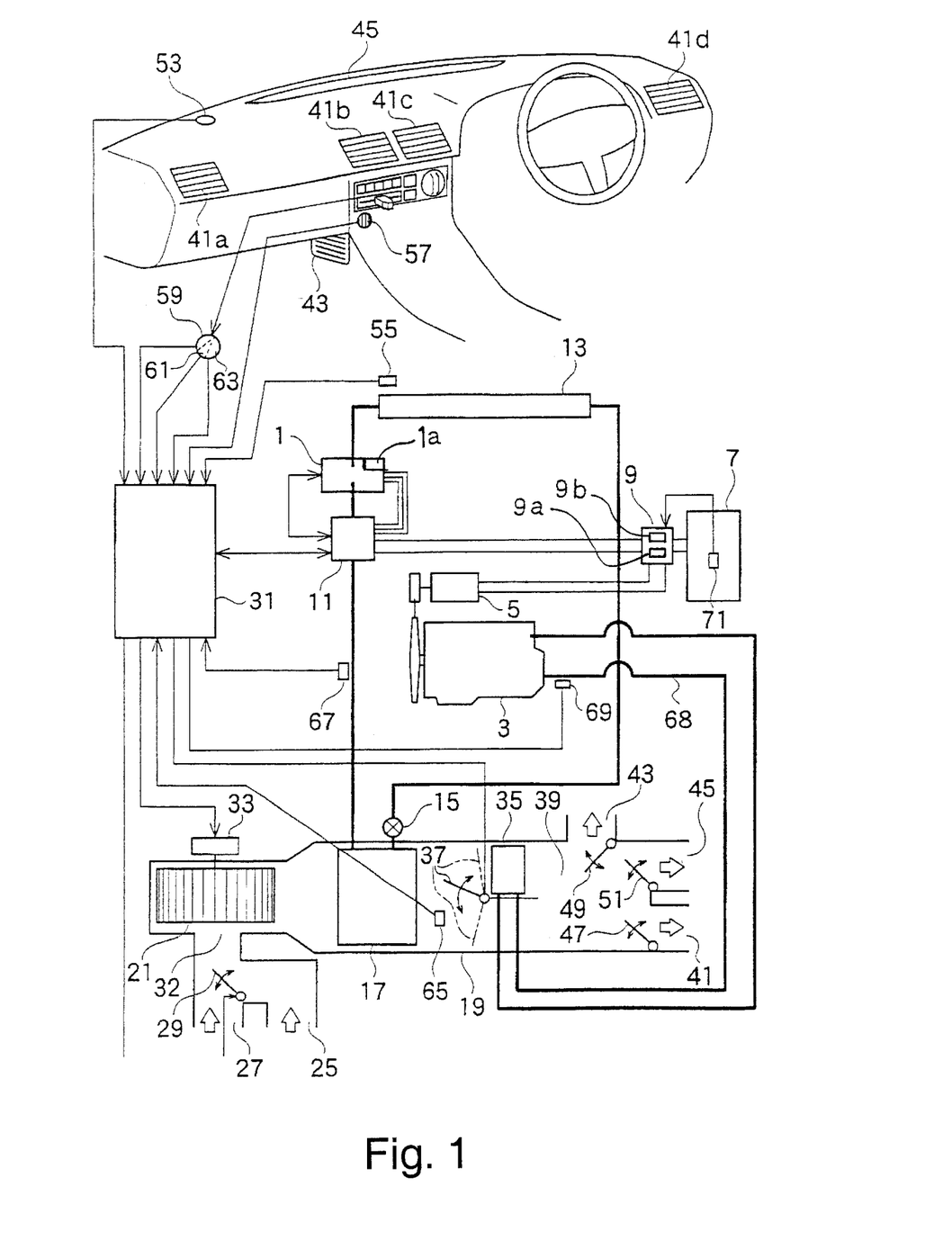
FIG. 1 is an overall schematic block diagram of a vehicle air-conditioning system in accordance with one embodiment of the present invention.

Referring initially to FIG. 1, an overall schematic block diagram of a vehicle with a vehicle air-conditioning system is illustrated in accordance with one embodiment of the present invention. In FIG. 1, the vehicle air-conditioning system includes a motor driven compressor 1 that is an electrically powered compressor installed in an engine compartment (not shown) of the vehicle. The motor driven compressor 1 is preferably a conventional component that applies a work load to compress a gasified refrigerant into a liquid refrigerant in a conventional manner. The motor driven compressor 1 is a conventional component that is well known in the art. Since motor driven compressors are well known in the art, the structure of the motor driven compressor 1 will not be discussed or illustrated in detail herein. The motor driven compressor 1 preferably has an internal motor 1a provided inside its casing.

The vehicle has an engine 3 that is operatively coupled to a motor generator 5 for supplying electrical power to the motor 1a of the motor driven compressor 1. The vehicle also has a battery 7 that is operatively coupled to the motor generator 5 to temporarily store electrical power in the battery 7. The motor driven compressor 1 has a battery controller 9 and a compressor inverter 11. The battery controller 9 includes a switching section or device 9a and a control section or device 9b.

Figure 2:
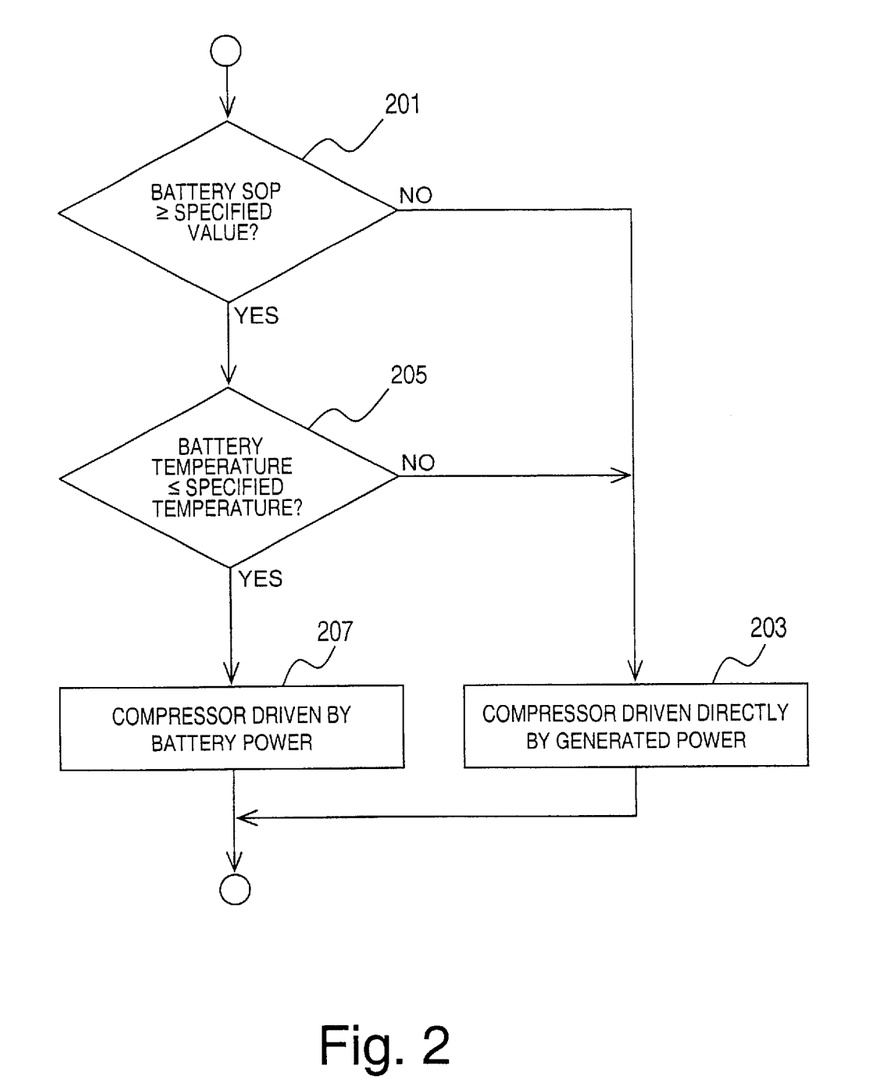
FIG. 2 is a flowchart showing the control operations of a battery controller of the vehicle air-conditioning system shown in FIG. 1 such that electrical energy is selectively supplied from either the battery or the generator of the engine.

As seen in FIG. 2, the battery controller 9 determines whether the electrical power in the battery 7 or the electrical power from the motor generator 5 is used to power the motor 1a of the motor driven compressor 1. The compressor inverter 11 is configured to vary the compressor capacity of the motor driven compressor 1 as required for the desired air-conditioning inside of a passenger compartment. The compressor inverter 11 is operatively coupled to the battery controller 9. Thus, the electric power generated and delivered directly from the motor generator 5, or the electric power generated by the motor generator 5 and temporarily stored in the battery 7 is supplied to the motor 1a of the compressor 1 via the compressor inverter 11 and the battery controller 9.

The vehicle air-conditioning system further includes a passenger compartment-external heat exchanger 13, an expansion valve 15, a passenger compartment-internal heat exchanger or evaporator 17 and an air blowing device or blower fan 21. The vehicle air-conditioning system's compression refrigerating cycle is basically conducted by the compressor 1, the passenger compartment-external heat exchanger 13, the expansion valve 15 and the passenger compartment-internal heat exchanger or evaporator 17.

The passenger compartment-external heat exchanger 13 is provided outside the passenger compartment. The passenger compartment-external heat exchanger 13 is configured to exchange heat between the outside or ambient air and refrigerant that is pumped by the compressor 1. One end of the passenger compartment-external heat exchanger 13 is connected to the refrigerant outlet of the compressor 1 and the other end is connected to the expansion valve 15 by refrigerant piping. This heat exchanger 13 serves as a passenger compartment-external condenser that releases heat from the refrigerant discharged from the compressor 1 to the outside air.

The passenger compartment-internal heat exchanger 17 is disposed inside a duct 19. The passenger compartment-internal heat exchanger 17 is configured to exchange heat between the refrigerant and the air that is to be blown into the passenger compartment by the blower fan 21. One end of the passenger compartment-internal heat exchanger 17 is connected to the refrigerant intake port of the compressor 1 and the other end is connected to the expansion valve 15 by refrigerant piping. When the compressor 1 is running, this heat exchanger 17 serves as a heat absorbing device and cools the air that is blown from the blower fan 21.

At the end of the duct 19 upstream of the passenger compartment-internal heat exchanger 17, there are provided an inside air inlet 25 that introduces air from inside the passenger compartment and an outside air inlet 27 that introduces outside air by way of the wind pressure that develops when the vehicle moves. At the branching portion between the inside air inlet 25 and the outside air inlet 27, there is provided an intake door 29 that is operated by an intake door actuator (not shown) driven by a controller 31 so as to open and close the inside air inlet 25 and the outside air inlet 27 to any arbitrary ratio. The intake door opening Xint indicates the opening of the intake door 29. The intake door opening Xint is also set such that Xint=0% when zero outside air is introduced and the inside air is introduced in full, and Xint=100% when zero inside air is introduced and the outside air is introduced in full.

The blower fan 21 is disposed between the passenger compartment-internal heat exchanger 17 and a merging section 32 where the inside air inlet 25 and the outside air inlet 27 merge. The blower fan 21 is rotated by a blower fan motor 33, which is driven by the controller 31.

A heater core 35 that introduces engine coolant is provided downstream of vehicle-internal heat exchanger 17 inside the duct 19. An air mix door 37 is provided in the vicinity of the upstream side of the heater core 35. The air mix door 37 is operated by an air mix door actuator (not shown) driven by the controller 31 and opens and closes so as to adjust the ratio of air that passes through the heater core 35 (warm air) to air that does not (cool air).

An air mix door opening Xmix, which indicates the opening of the air mix door 37, is set such that Xmix=0% (fully closed, fully cool) when the air mix door 37 is in the position indicated by the single-dot chain line and zero air passes through the heater core 35 and Xmix=100% (fully open, fully hot) when the air mix door 37 is in the position indicated by the double-dot chain line and all of the air passes through the heater core 35.

Downstream of the heater core 35 in the duct 19 is an air mix chamber 39 that makes temperature-adjusted air-conditioning air by promoting the mixture of the aforementioned warm and cool air. The following items are provided in the air mix chamber 39: a plurality of vent outlets 41 (41a, 41b, 41c, and 41d) that blow air-conditioning air toward the upper body of the respective passengers (not shown); a plurality of foot outlets 43 that blow air-conditioning air toward the feet of the respective passengers; and a defroster outlet 45 that blows air-conditioning air toward the front windshield (not shown).

A vent door 47, a foot door 49, and a defroster door 51 are each provided inside the air mix chamber 39. The vent door 47 is operated by a vent door actuator (not shown) that is driven by the controller 31 to open and close the vent outlets 41. The foot door 49 is operated by a foot door actuator (not shown) that is driven by the controller 31 so as to open and close the foot outlets 43. The defroster door 51 is operated by a defroster door actuator (not shown) that is driven by the controller 31 so as to open and close the defroster outlet 45.

The following thermal environment information is inputted to the controller 31: the amount of solar radiation Qsun incident on the vehicle detected by a solar quantity sensor 53 arranged on the dashboard; the outside temperature Tamb detected by an outside temperature sensor 55 arranged on the outside of the passenger compartment; the inside temperature Tic inside the passenger compartment detected by a passenger compartment temperature sensor 57 arranged inside the passenger compartment; the passenger compartment temperature setting Tptc established by passenger compartment temperature setting device 59 arranged in the instrument panel; the setting values of an air outlet mode switch 61 and blower fan switch 63 arranged in the instrument panel; the outlet air temperature Tout of the passenger compartment-internal heat exchanger 17 detected by a passenger compartment-internal heat exchanger outlet temperature sensor 65 arranged in the vicinity of the downstream side of the passenger compartment-internal heat exchanger 17; the intake refrigerant temperature Tref of the compressor 1 detected by a compressor intake refrigerant temperature sensor 67 arranged in the refrigerant piping on the intake side of the compressor 1; and coolant temperature Tw detected by a coolant temperature sensor 69 arranged in a coolant pipe 68 on the coolant outlet side of the engine.

The compressor intake refrigerant temperature sensor 67 constitutes the thermal load detecting device that detects the air-conditioning thermal load. Therefore, the intake refrigerant temperature Tref of the compressor 1 corresponds to the air-conditioning thermal load. Thus, by detecting the air-conditioning thermal load using the intake refrigerant temperature of the compressor 1, the thermal load can be detected easily using such known means as a refrigerant temperature sensor.

Based on these thermal environment information inputs, the controller 31 computes such target cooling/heating conditions as the compressor rotational speed Ncomp, the air mix door opening Xmix, the intake door opening Xint, the air outlet mode, the blower fan voltage Vfan, and the target outlet air temperature Tof. In order to hold the cooling/heating conditions inside the passenger compartment at the computed target cooling/heating conditions, the controller 31 drives the blower fan motor 33, the intake door actuator, the air mix door actuator, the vent door actuator, the foot door actuator, and the defroster door actuator and sends a compressor rotational speed signal to the compressor inverter 11.

Also, the controller 31 compares the compressor intake refrigerant temperature Tref with a first temperature setting Tset1, which serves as a first prescribed temperature. When Tref is greater than Tset1, the controller 31 functions as an allowable rotational speed setting device that sets the maximum allowable rotational speed of the compressor 1 in response to Tref. The controller 31 also functions as an airflow rate correcting device that lowers the voltage of blower fan motor 33 to reduce or stop the airflow of the blower fan 21, when Tref is greater than Tset1.

The compressor inverter 11 is arranged such that it contacts the intake refrigerant of the compressor 1 through piping and the casing wall in a conventional manner. The compressor inverter 11 is cooled using the cold air of the intake refrigerant. As a result, it is possible to eliminate special piping and dedicated heat exchangers that are dedicated to cooling the compressor inverter 11. The compressor inverter 11 sends information regarding such items as the rotational speed, the voltage, and the current of the compressor 1 and the existence of an error to the controller 31. Meanwhile, the compressor inverter 11 controls the operation of the compressor 1 and varies the capacity of the compressor 1 as required for the desired air-conditioning in the passenger compartment while receiving a rotational speed signal or ON/OFF signal for the compressor 1 from the controller 31.

The battery controller 9 receives information regarding the battery temperature and remaining battery capacity (SOP: state-of-power) from a remaining electric power or SOP (state-of-power) sensor (not shown) and a battery temperature sensor 71 and executes control such that the remaining capacity and temperature of the battery 7 match the preset conditions. The battery controller 9 selects the source of the power delivered to the compressor 1 through the compressor inverter 11 in the manner indicated in the flowchart of FIG. 2. The battery controller 9 preferably includes a microcomputer with a control program that controls the compressor inverter 11. The battery controller 9 can also include other conventional components such as an input interface circuit, an output interface circuit, and storage devices such as a ROM (Read Only Memory) device and a RAM (Random Access Memory) device.

First, based on the signal from the remaining electric power sensor, the battery controller 9 determines whether or not the battery SOP is greater than or equal to a specified value (Step S201). If the battery SOP is below the specified value, the battery controller 9 gives priority to charging the battery 7 and prohibits use of the battery power so that the compressor 1 is driven directly by electric power generated by the motor generator 5 (Step S203).

If the battery SOP is greater than or equal to the specified value, the battery controller 9 determines whether or not the battery temperature is less than or equal to a specified value based on the detection signal from the battery temperature sensor 71 (Step S205). If the battery temperature is above the prescribed temperature, the battery controller 9 prohibits use of the battery power so that the compressor 1 is driving directly by the electric power generated by the motor generator 5.

If the battery temperature is less than or equal to the specified temperature, i.e., if the battery SOP and the battery temperature are both in a prescribed state, compressor is driven using electric power from the battery 7 (Step S207).

Thus, if the remaining battery capacity is below the specified value or the battery temperature is above or equal to the specified temperature, the motor generator 5 is used instead of the battery 7 to supply electric power to the motor 1a via the compressor inverter 11. The burden on the battery 7 is lightened and overheating is suppressed, particularly when the compressor 1 is starting up. Consequently, shortening of the service life of the battery is prevented.

In an actual vehicle, a radiator is provided rearwardly in the vehicle relative to the passenger compartment-external heat exchanger 13. The radiator receives engine coolant and discharges heat into the atmosphere. The radiator is not shown in FIG. 1, since it is a conventional device that is well known in the art.

Next, the operation of the previously described embodiment of the vehicle air-conditioning system will be described based on the flowcharts of FIGS. 3 and 4, which show the control operations of the controller 31.

The controller 31 preferably includes a microcomputer with a control program that is programmed to control the vehicle air-conditioning system as discussed below. The controller 31 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 31 can be any combination of hardware and software that will carry out the functions of the present invention.

When control begins, the controller 31 receives the values outputted by the aforementioned sensors and actuators, i.e., the target passenger compartment temperature Tptc set by the passenger, the coolant temperature Tw, the outlet air temperature Tout of the passenger compartment-internal heat exchanger 17, the outside air temperature Tamb, the passenger compartment temperature Tic, the incident solar quantity Qsun, the blower fan motor voltage Vfan, the intake door opening Xint, the air mix door opening Xmix, the compressor intake refrigerant temperature Tref, and the compressor rotational speed Ncomp (Step S301).

Then, in accordance with normal temperature control, the controller 31 computes the target values for each of the actuators, i.e., for the compressor rotational speed, the blower fan motor voltage, the intake door opening, the air mix door opening, etc. (Step S303).

Next, the controller 31 determines if the compressor 1 has just been started (Step S305). If the compressor has not just started, the controller 31 determines if the startup control flag is ON or OFF (Step S307). The startup control flag is ON for a predetermined start up time period of the compressor 1 after the compressor 1 is started. If the startup control flag is OFF, then the startup control or predetermined start up time period has ended, and then the controller 31 outputs the actuator target values computed in Step S303 as control signals (Step S309) to operate the vehicle air-conditioning system in accordance with the actuator target values.

Meanwhile, if the startup control flag is ON (indicating startup control is in progress) or if it is determined that the compressor has just started in Step S305, the controller 31 determines if the compressor intake refrigerant temperature Tref is higher or greater than first temperature setting Tset1 (Step S311).

If Tref is greater than Tset1, the startup control flag is set to ON (Step S401) because the controller 31 determines that the compressor intake refrigerant temperature Tref is high and it is necessary to continue the startup control. Conversely, if Tref is less than or equal to Tset1, the controller 31 determines that the compressor intake refrigerant temperature has decreased sufficiently to allow canceling the startup control and sets the startup control flag to OFF (Step S313). The controller 31 then outputs the actuator target values computed in Step S303 as the control signals (Step S309).

Figure 4:
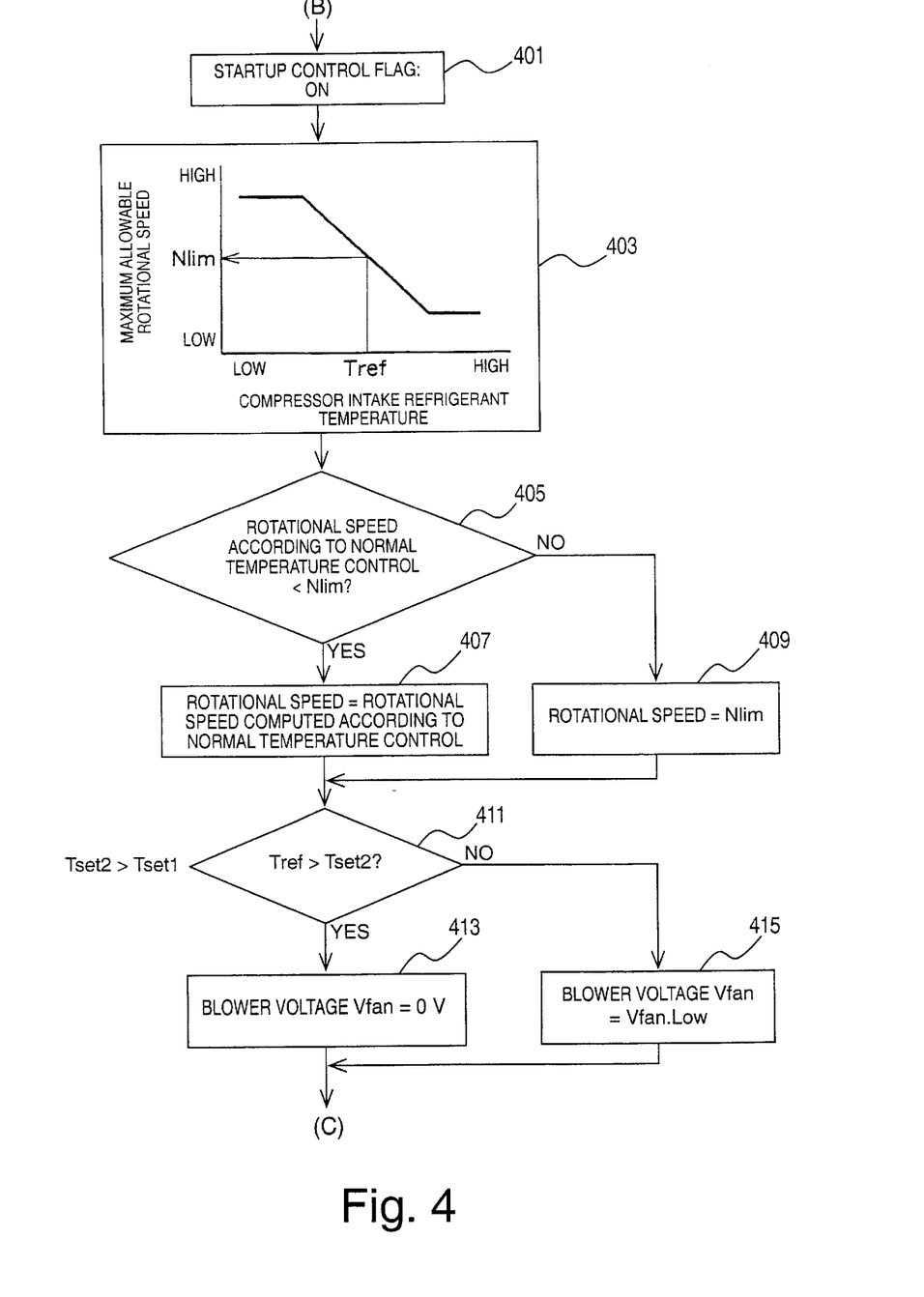
FIG. 4 is a flowchart showing the control operations of the main controller of the vehicle air-conditioning system shown in FIG. 1.

After setting the startup control flag to ON in Step S401 of FIG. 4, the controller 31 computes the maximum allowable rotational speed Nlim of the compressor 1 in response to the compressor intake refrigerant temperature Tref (Step S403). Here, the maximum allowable rotational speed is set to a low value when Tref is high and to a higher value when Tref is decreases.

If the compressor 1 were operated at a high rotational speed while Tref was high, there would be a high possibility that a large current would flow momentarily through the electronic devices of the inverter 11 and cause the electronic devices to become excessively hot and rapidly overheat. Therefore, as previously mentioned, when Tref is high, the maximum allowable rotational speed is set to a low value so that overheating of the electronic devices inside the compressor inverter 11 can be suppressed.

Next, the controller 31 determines if the rotational speed according to the normal temperature control computed in Step S303 is lower than the maximum allowable rotational speed Nlim (Step S405). If the rotational speed according to normal temperature control is less than Nlim, then the rotational speed for the normal temperature control computed in Step S303 is set as the compressor rotational speed (Step S407).

Conversely, if the rotational speed for the normal temperature control is greater than or equal to Nlim, then the maximum allowable rotational speed Nlim computed in Step S403 is set as the compressor rotational speed (Step S409). In short, either the rotational speed for the normal temperature control (Step S303) or the maximum allowable rotational speed Nlim (Step S409), whichever is smaller, is set as the compressor rotational speed.

Next, the controller 31 determines if the compressor intake refrigerant temperature Tref is higher than a second temperature setting Tset2, which is a second prescribed temperature setting that is greater than Tset1 (Step S411). If Tref is greater than Tset2, the controller 31 sets the voltage of the blower fan motor 33 to 0 V, i.e., stops the motor 1a) (Step S413). Meanwhile, if Tref is less than or equal to Tset2, the controller 31 sets the voltage of the blower fan motor 33 to the minimum voltage Vfan.Low (Step S415) needed to operate the blower fan 21 at the desired airflow rate.

Thus, by setting the voltage of the blower fan motor 33 to a smaller voltage than during the normal temperature control, the controller 31 selects a method by which the airflow rate from the blower fan 21 is reduced, and the amount of heat absorbed from the passenger compartment-internal heat exchanger 17 is reduced to promote lowering of the compressor intake refrigerant temperature. As a result, the current in the compressor inverter 11 can be held low at the time of compressor startup and overheating of the electronic devices inside the inverter 11 can be suppressed.

When Tref is less than or equal to Tset2, the compressor intake refrigerant temperature can be lowered even while the refrigerant is absorbing heat from the passenger compartment-internal heat exchanger 17. However, when Tref is higher than Tset2, the compressor rotational speed is reduced further and the cooling capacity of the air-conditioning cycle declines. Therefore, the controller 31 sets the blower fan motor voltage to 0 V (i.e., stops the motor), thereby eliminating heat absorption from the passenger compartment-internal heat exchanger 17 and using the entire cooling capacity of the air-conditioning cycle to lower the compressor intake refrigerant temperature.

Figure 3:
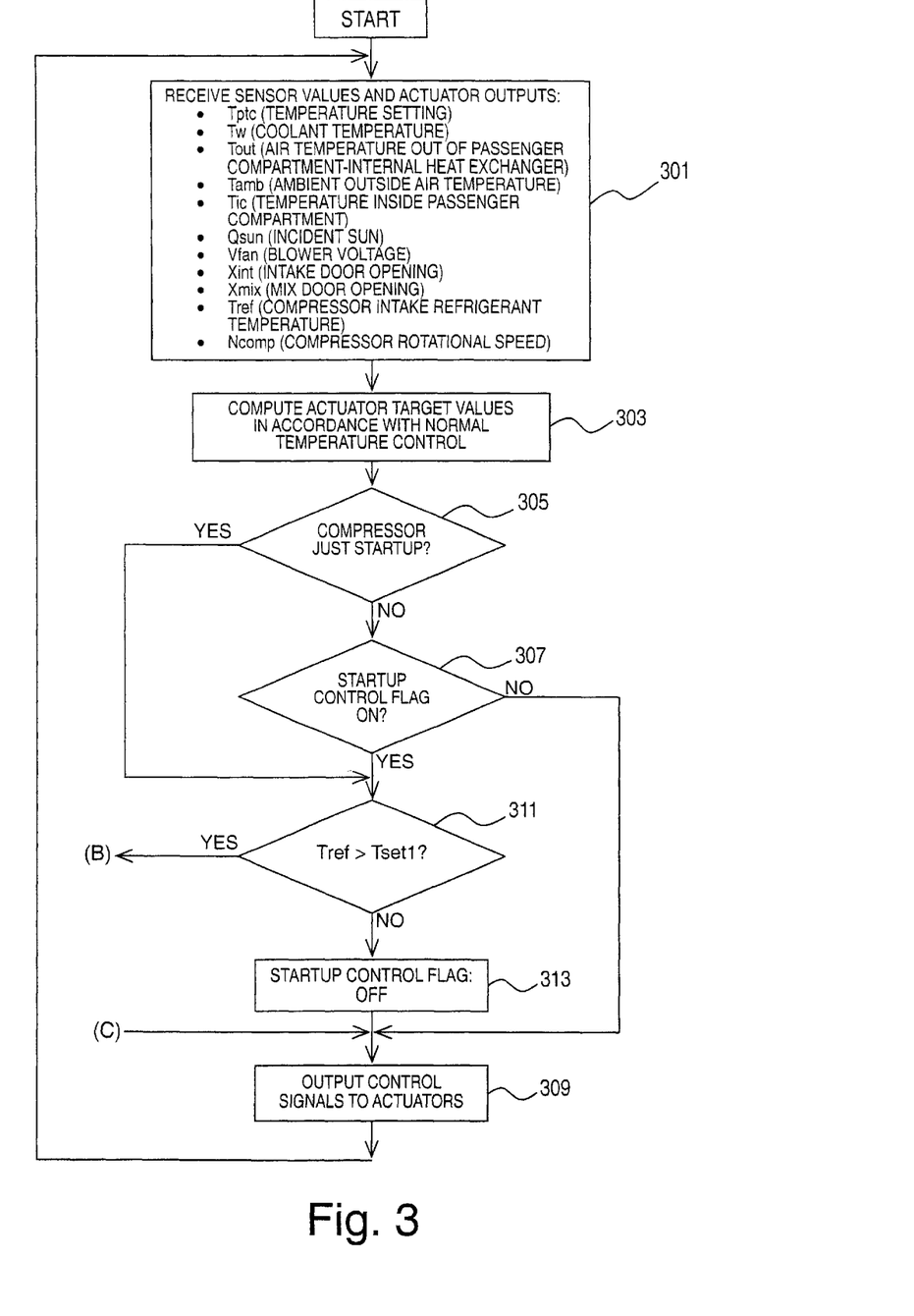
FIG. 3 is a flowchart showing the control operations of a main controller of the vehicle air-conditioning system shown in FIG. 1.

After setting the blower fan motor voltage in Steps 413 and 415, the controller 31 proceeds to Step S309 in FIG. 3 and outputs the following as control signals: the compressor rotational speed set in Step S407 or Step S409, the blower fan motor voltage set in Step S413 or Step S415, and all of the actuator target values computed in Step S303 except the those for the compressor and the blower fan motor.

In the preceding embodiment, the compressor 1 and the inverter 11 were separate entities, but a similar effect can be obtained when the compressor 1 and the inverter 11 are integrated into a single unit.

The compressor 1 was described as being driven by a motor provided integrally within the casing, but it is also acceptable to drive the compressor with a motor that is separate and disposed outside the casing.

The compressor 1 was also described as being normally driven by electric power, but the compressor can also be of a hybrid type for which belt drive by the engine or motor drive can be selected.

As previously described, if the compressor intake refrigerant temperature is high when the air-conditioner begins running (when the compressor starts up), the maximum allowable rotational speed of the compressor 1 is limited and setting changes are made such that the voltage of the blower fan motor 33 becomes smaller. Consequently, immediately after the air-conditioner begins running, overheating of the electronic devices inside the compressor inverter 11 can suppressed and the compressor rotational speed can be raised to the maximum rotational speed in an effective manner so as to tap into the capacity of the air-conditioning cycle.

The term "configured" as used herein to describe a component, device, section or part of the present invention includes any structure, hardware and/or software that is constructed and/or programmed to carry out the desired function and/or result.

Terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-329281. The entire disclosure of Japanese Patent Application No. 2000-329281 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air-conditioning system comprising:

refrigerant compressing means for supplying a compressed refrigerant;

inverter means for varying compressor capacity of the refrigerant compressing means for providing a predetermined air-conditioning level inside of a passenger compartment;

passenger compartment-external heat exchanger means for exchanging heat between outside air and refrigerant pumped by the refrigerant compressing means;

a passenger compartment-internal heat exchanger configured to exchange heat between the refrigerant and air that is blown into the passenger compartment by an air blowing means;

thermal load detecting means for detecting a thermal load of the refrigerant compressing means; and airflow rate correcting means for adjusting airflow rate in such a manner that the airflow rate delivered by the air blowing means decreases as the thermal load detected by the thermal load detecting means increases.

2. A vehicle air-conditioning system comprising:

refrigerant compressing means for supplying a compressed refrigerant;

inverter means for varying compressor capacity of the refrigerant compressing means for providing a predetermined air-conditioning level inside of a passenger compartment;

passenger compartment-external heat exchanger means for exchanging heat between outside air and refrigerant pumped by the refrigerant compressing means;

a passenger compartment-internal heat exchanger configured to exchange heat between the refrigerant and air that is blown into the passenger compartment by an air blowing means;

thermal load detecting means for detecting a thermal load of the refrigerant compressing means;

switching means for selectively delivering electrical power from one of a battery and an electric generating device to drive the refrigerant compressing means; and control means for operating the switching means such that the electrical power to drive the refrigerant compressing means is delivered from the generating device when the thermal load detected by the thermal load detecting means is higher than a prescribed thermal load during a predetermined start up time period of the generating device.

3. A vehicle air-conditioning system comprising:

a compressor;

a compressor inverter configured to vary the compressor capacity of the compressor to provide a predetermined air-conditioning level inside of a passenger compartment;

a passenger compartment-external heat exchanger configured to exchange heat between outside air and refrigerant pumped by the compressor;

a passenger compartment-internal heat exchanger configured to exchange heat between the refrigerant and air that is blown into the passenger compartment by an air blowing device;

a thermal load detecting device configured to detect a thermal load of the compressor; and an airflow rate correcting device configured to adjust airflow rate in such a manner that the airflow rate delivered by the air blowing device decreases as the thermal load detected by the thermal load detecting device increases.

4. The vehicle air-conditioning system as recited in claim 3, wherein the airflow rate correcting device is further configured to stop the airflow from the air blowing device when the thermal load detected by the thermal load detecting device is higher than a prescribed value Tset2.

5. The vehicle air-conditioning system as recited in claim 4, wherein the airflow rate correcting device is further configured to only adjust the airflow rate when the thermal load detected by the thermal load detecting device is higher than a prescribed value Tset1, which is lower than the prescribed value Tset2.

6. The vehicle air-conditioning system as recited in claim 3, wherein the airflow rate correcting device is further configured to only adjust the airflow rate when the thermal load detected by the thermal load detecting device is higher than a prescribed value Tset1.

7. The vehicle air-conditioning system as recited in claim 3, further comprising a switching device configured to selectively delivery electrical power from one of a battery and an electric generating device to drive the compressor; and a control device configured to operate the switching device such that the electrical power to drive the compressor is delivered from the generating device when the thermal load detected by the thermal load detecting device is higher than a prescribed value.

8. The vehicle air-conditioning system as recited in claim 3, further comprising an allowable rotational speed setting device configured to set a maximum allowable rotational speed of the compressor to a lower speed when the thermal load detected by the thermal load detecting device is higher than a prescribed thermal load during a predetermined start up time period of the compressor.

9. The vehicle air-conditioning system as recited in claim 3, wherein the thermal load detecting device detects the air-conditioning thermal load based on an intake refrigerant temperature of the compressor.

10. The vehicle air-conditioning system as recited in claim 3, wherein the airflow rate correcting device is further configured to adjust the airflow rate only after determining the compressor is operating in a predetermined start up time period of the compressor.

11. The vehicle air-conditioning system as recited in claim 10, wherein the airflow rate correcting device is further configured to only adjust the airflow rate when the thermal load detected by the thermal load detecting device is higher than a prescribed value Tset1.

12. The vehicle air-conditioning system as recited in claim 11, wherein the airflow rate correcting device is further configured to stop the airflow from the air blowing device when the thermal load detected by the thermal load detecting device is higher than a prescribed value Tset2, which is higher than the prescribed value Tset1.

13. The vehicle air-conditioning system as recited in claim 12, further comprising an allowable rotational speed setting device configured to set a maximum allowable rotational speed of the compressor to a lower speed when the thermal load detected by the thermal load detecting device is higher than a prescribed thermal load during the predetermined start up time period of the compressor.

14. A vehicle air-conditioning system comprising:

a compressor;

a compressor inverter configured to vary the compressor capacity of the compressor to provide a predetermined air-conditioning level inside of a passenger compartment;

a passenger compartment-external heat exchanger configured to exchange heat between outside air and refrigerant pumped by the compressor;

a passenger compartment-internal heat exchanger configured to exchange heat between the refrigerant and air that is blown into the passenger compartment by an air blowing device;

a thermal load detecting device configured to detect a thermal load of the compressor;

a switching device configured to selectively delivery electrical power from one of a battery and an electric generating device to drive the compressor; and a control device configured to operate the switching device such that the electrical power to drive the compressor is delivered from the generating device when the thermal load detected by the thermal load detecting device is higher than a prescribed thermal load upon start up of the compressor.

15. The vehicle air-conditioning system as recited in claim 14, further comprising an allowable rotational speed setting device configured to set a maximum allowable rotational speed of the compressor to a lower speed when the thermal load detected by the thermal load detecting device is higher than a prescribed value during a predetermined start up time period of the compressor.

16. The vehicle air-conditioning system as recited in claim 14, wherein the thermal load detecting device detects the air-conditioning thermal load based on an intake refrigerant temperature of the compressor.

17. The vehicle air-conditioning system as recited in claim 14, further comprising an airflow rate correcting device configured to adjust airflow rate in such a manner that the airflow rate delivered by the air blowing device decreases as the thermal load detected by the thermal load detecting device increases when the thermal load detected by the thermal load detecting device is higher than a prescribed value Tset1.

18. The vehicle air-conditioning system as recited in claim 17, wherein the airflow rate correcting device configured to stop the airflow from the air blowing device when the thermal load detected by the thermal load detecting device is higher than a prescribed value Tset2, which is higher than the prescribed value Tset1.

19. The vehicle air-conditioning system as recited in claim 14, further comprising an airflow rate correcting device configured to stop the airflow from the air blowing device when the thermal load detected by the thermal load detecting device is higher than a prescribed value Tset2.

20. The vehicle air-conditioning system as recited in claim 19, wherein the airflow rate correcting device configured to adjust airflow rate in such a manner that the airflow rate delivered by the air blowing device decreases as the thermal load detected by the thermal load detecting device increases when the thermal load detected by the thermal load detecting device is higher than a prescribed value Tset1, which is lower than the prescribed value Tset2.

* * * * *